US012711705B2

(12) United States Patent
Sievers et al.

(10) Patent No.: US 12,711,705 B2
(45) Date of Patent: Aug. 18, 2026

(54) SIMULATING A PERCEPTION SENSOR

(71) Applicant: dSPACE GmbH, Paderborn (DE)

(72) Inventors: Gregor Sievers, Paderborn (DE); Thomas Lessmann, Paderborn (DE)

(73) Assignee: dSPACE GmbH, Paderborn (DE)

( * ) Notice: Subject to any disclaimer, the term of this patent is extended or adjusted under 35 U.S.C. 154(b) by 173 days.

(21) Appl. No.: 18/615,552

(22) Filed: Mar. 25, 2024

(65) Prior Publication Data

US 2025/0299439 A1 Sep. 25, 2025

(51) Int. Cl.
*G06F 30/20* (2020.01)
*G06T 17/00* (2006.01)

(52) U.S. Cl.
CPC .................................... *G06T 17/00* (2013.01)

(58) Field of Classification Search
CPC .. G06F 30/20; G06F 11/3692; G06F 11/3684; G06F 11/3698; G06F 1/30; G06F 11/3688; G06F 2119/06; G06F 9/455; G06F 11/36; G06F 11/3696; G06T 19/003; G06T 17/00
See application file for complete search history.

(56) References Cited

U.S. PATENT DOCUMENTS

2018/0116017 A1* 4/2018 Gong ..................... H05B 45/48
2022/0260706 A1 8/2022 Junginger et al.
2023/0341883 A1* 10/2023 Lu ............................ G05F 3/08
2024/0193870 A1* 6/2024 Zhou ....................... G06F 30/20

FOREIGN PATENT DOCUMENTS

DE 102021201331 A1 8/2022

OTHER PUBLICATIONS

Pak Hung Chan et al; "A Framework to Analyze Noise Factors of Automotive Perseption Sensors" May 21, 2020; WMG, The University of Warwick, Coventry CV4 7AL.

Molenaar et al; "Full Spectrum Camera Simulation for Reliable Virtual Development and Validation of ADAS and Automated Driving Applications"; 2015 IEEE Intelligent Vehicles Symposium (IV) Jun. 28-Jul. 1, 2015.

* cited by examiner

*Primary Examiner* — Hau H Nguyen
(74) *Attorney, Agent, or Firm* — Muncy, Geissler, Olds & Lowe, P.C.

(57) ABSTRACT

A simulator for a perception sensor, wherein the simulator comprises a computing core for an execution of a simulation model of the perception sensor. The simulation model generates, based on a virtual 3D environment, synthetic sensor data in such a way as the perception sensor would generate real sensor data in a real environment corresponding to the virtual 3D environment. The simulator comprises an interface for transmitting the synthetic sensor data to a test specimen and for reading in control commands from the test specimen. The interface includes an electrical connection for simulating a power supply from the test specimen to the perception sensor. The interface comprises a controllable resistor for controlling an electrical resistance of the electrical connection. The simulation model calculates a power consumption of the simulated perception sensor from at least one variable value of the simulation model at runtime and controls the controllable resistor.

19 Claims, 4 Drawing Sheets

SIMULATING A PERCEPTION SENSOR

BACKGROUND OF THE INVENTION

Field of the Invention

The invention relates to a simulator for a perception sensor, wherein the simulator comprises a computing core for an execution of a simulation model of the perception sensor, the simulation model generates, based on a virtual 3D environment, synthetic sensor data in such a way as the perception sensor would generate real sensor data in a real environment corresponding to the virtual 3D environment, the simulator comprises an interface for transmitting the synthetic sensor data to a test specimen and for reading in control commands from the test specimen, the interface includes an electrical connection for simulating a power supply from the test specimen to the perception sensor, and the interface comprises a controllable resistor for controlling an electrical resistance of the electrical connection. The invention also relates to a method for simulating a perception sensor on the basis of a simulation model.

Description of the Background Art

Modern control systems, especially in the context of autonomous or semi-autonomous vehicles, are heavily reliant on advanced imaging technologies. These systems use a variety of imaging sensors, such as cameras, LIDAR (Light Detection and Ranging) units, and radar systems to perceive and interpret the environment around them. The integration of these sensors into a vehicle's control system is a complex and intricate process, vital for the safe and efficient operation of autonomous vehicles.

In these systems, typically, a single coaxial cable connects each sensor to the electronic control unit (ECU). This setup is not only efficient but also minimizes the complexity and weight of the wiring harness in the vehicle. The coaxial cable serves multiple purposes: it transmits sensor data to the ECU, carries configuration data, and also supplies power to the sensor. This is often achieved through power over coax (PoC) technology, where a direct current (DC) voltage is superimposed on the coaxial cable along with the radio frequency (RF) data signals.

The power delivery via PoC is ingeniously engineered. On the ECU side, appropriate filters are used to couple the DC voltage into the coaxial cable without interfering with the data signals. At the sensor end, further filters are deployed to separate the DC voltage from the RF data signal. In a camera, for instance, this voltage is then converted to the required levels for different components, such as the serializer and the camera chip (imager). Typical voltage levels range from 5 V to 14 V, depending on the specifications of the ECU.

When developing these control systems, simulation techniques such as Software in the Loop (SIL) or Hardware in the Loop (HIL) are often employed. These simulations are crucial for testing and validating the functionality of the control systems in a controlled and safe environment. In these setups, a simulator generates artificial images based on a virtual 3D environment, mimicking the data a real sensor would capture in the real world. These artificial images are then fed into the control system under test, allowing for thorough and repeatable testing.

An aspect of these simulations is the need to simulate not just the sensor data but also the physical characteristics of the sensor, like power consumption. The simulator must give the control system the illusion of interacting with a real sensor, including drawing power in a manner consistent with the actual sensor. If the power consumption does not match the expectations of the control system, it might trigger an error mode, rendering the test ineffective.

Conventionally, the simulation of power consumption is achieved using hard-wired resistors, which are customized to match the power consumption profile of the control system. However, this approach has its limitations. It is relatively inflexible and does not allow for changes in power consumption during runtime, which might occur due to changes in operating modes or other dynamic factors in the real-world operation of the vehicle.

In summary, conventional control systems in autonomous vehicles are complex assemblies that integrate various imaging sensors through efficient and multifunctional coaxial cables. The development and testing of these systems are equally complex and require sophisticated simulation techniques to ensure their reliability and safety. The challenge lies in not only simulating the sensor data but also accurately replicating the physical characteristics of the sensors, such as power consumption, to ensure comprehensive and effective testing. Modern control systems, especially in the context of autonomous or semi-autonomous vehicles, are heavily reliant on advanced imaging technologies. These systems use a variety of imaging sensors, such as cameras, LIDAR (Light Detection and Ranging) units, and radar systems to perceive and interpret the environment around them. The integration of these sensors into a vehicle's control system is a complex and intricate process, vital for the safe and efficient operation of autonomous vehicles.

From the document "Pak Hung Chan, Gunwant Dhadyalla, and Valentina Donzella, "A Framework to Analyze Noise Factors of Automotive Perception Sensors", Sensors Letters Vol. 4, No. 6, June 2020", it is described that automated vehicles (AVs) are one of the breakthroughs of this century and that the main argument to support their development is increased safety and reduction of human and economic losses. However, to demonstrate that AVs are safer than human drivers billions of miles of testing are required. Thus, realistic simulation and virtual testing of AV systems and sensors are crucial to accelerate the technological readiness. In particular, perception sensor measurements are affected by uncertainties due to noise factors. These uncertainties need to be included in simulations. This document presents a framework to analyze and simulate the effect of the combination of noise factors on sensor data. In this respect, the framework was applied to analyze one sensor, the light detection and ranging (LIDAR). Results demonstrate that single noise factor analysis gives an incomplete knowledge of measurement degradation and perception is dramatically hindered when more noises are combined. The proposed framework is a tool to predict the degradation of AV sensor performance.

SUMMARY OF THE INVENTION

It is therefore an object of the invention to provide a simulator for a perception sensor, wherein the simulator comprises a computing core for an execution of a simulation model of the perception sensor, the simulation model generates, based on a virtual 3D environment, synthetic sensor data in such a way as the perception sensor would generate real sensor data in a real environment corresponding to the virtual 3D environment, the simulator comprises an interface for transmitting the synthetic sensor data to a test specimen and for reading in control commands from the test specimen, the interface includes an electrical connection for simulating a power supply from the test specimen to the perception sensor, the interface comprises a controllable resistor for controlling an electrical resistance of the electrical connection, and the simulation model calculates a power consumption of the simulated perception sensor from at least one variable value of the simulation model at runtime and controls the controllable resistor in such a way that a power consumption of the electrical connection corresponds to the calculated power consumption of the simulated perception sensor at any point in time during runtime of the simulation model.

Therefore, the present invention relates to a simulator designed for perception sensors, offering an approach to simulate sensor behavior and functionality within a virtual 3D environment. This simulator is engineered to bridge the gap between virtual simulations and real-world sensor operations, providing a highly accurate and dynamic testing platform for various perception sensors. A computing core is provided which is capable of executing a detailed simulation model of the perception sensor. This model is adept at generating synthetic sensor data that accurately replicates what a real perception sensor would produce in an equivalent real environment. The foundation of this simulation is a virtual 3D environment, enabling a realistic and comprehensive emulation of physical conditions and scenarios.

A feature of this simulator is its interface, which serves a dual purpose. Firstly, it offers the transmission of the synthetic sensor data to a test specimen, thereby enabling a realistic interaction between the simulated sensor and a real or virtual test environment. Secondly, this interface is designed to receive control commands from the test specimen, further enhancing the realism and applicability of the simulation.

The electrical connection included in the interface comprises a component which simulates the power supply dynamics from the test specimen to the perception sensor using a controllable resistor. This control mechanism is instrumental in mirroring real-world power consumption patterns of perception sensors, thereby adding another layer of authenticity to the simulation.

Moreover, the simulation model is meticulously designed to calculate the power consumption of the simulated perception sensor. This calculation may be based on at least one various variable value of the simulation model at runtime, ensuring a dynamic and responsive simulation process. The controllable resistor is regulated in such a way that the power consumption of the electrical connection aligns with the calculated power consumption of the simulated perception sensor consistently during the simulation model's runtime.

The simulator may take into account the temperature of the perception sensor as the at least one variable value, recognizing the critical impact of temperature on sensor performance. In an example, the simulation model considers the temperature dependence of the electrical behavior of at least one component of the perception sensor, ensuring a highly accurate and realistic simulation.

The simulator can further extend to include specific operating variables for the perception sensor within the simulation model. These variables may include, but are not limited to, frames per second, exposures per image, and different High Dynamic Range (HDR) output modes, such as linear or exponential. This inclusion ensures that the simulator can cater to a wide range of sensor functionalities and scenarios. The term frames per second (FPS) refers to the number of images (frames) a camera or sensor captures in one second. A higher FPS rate means more images are captured in a given time, leading to smoother motion in the resulting video. In perception sensors, a high FPS is often crucial for accurately tracking fast-moving objects or changes in the environment. The term exposures per image relates to the number of exposures a camera sensor takes for a single image. This is particularly relevant in High Dynamic Range (HDR) photography. In HDR imaging, multiple exposures of the same scene are taken at different exposure levels and then combined into one image. This process captures a wider range of luminance levels than a single exposure, better representing the range of intensities found in real scenes, from direct sunlight to deep shadows. Therefore, HDR refers to techniques used in imaging and photography to produce a greater range of luminance levels than what is possible with standard digital imaging techniques. Different HDR output modes affect how this range is captured and represented: In linear HDR mode, the output maintains a linear relationship between the captured light and the resulting pixel values. This mode is often used in professional settings where post-processing will be applied, as it provides more detail in the highlights and shadows for editing. Exponential or logarithmic HDR mode applies a non-linear curve to the luminance levels, compressing the dynamic range into a format more suitable for display for specific post-processing needs. These modes are useful for getting a more 'natural' look directly from the camera, as they better approximate how the human eye perceives light and dark. Perception sensors with different HDR output modes can adapt to various lighting conditions more effectively, capturing details in both very bright and very dark areas of a scene. This adaptability is crucial in applications like autonomous vehicles where accurate visual interpretation is key, regardless of lighting conditions.

Additionally, the electrical connection in this simulator may be designed to incorporate controllable capacitance and/or inductance, which can be regulated based on at least one variable value of the simulation model at runtime. This feature allows for a more comprehensive simulation of the electrical characteristics of the sensor, enhancing the fidelity of the simulation.

The perception sensor simulated by this invention can be an imaging sensor, including but not limited to cameras, radars, LIDARs, or sonars. This versatility makes the simulator applicable across a wide range of sensor technologies and applications.

Furthermore, the computing core of the simulator is adaptable and can be implemented using various technologies such as a CPU, GPU, or FPGA, providing flexibility and scalability in terms of computational power and efficiency. The abbreviations CPU, GPU, and FPGA stand for different types of processors or integrated circuits used in computers and other electronic devices. Each has a specific role and architecture: A CPU, also known as the central processing unit or main processor, is the heart of a computer. It performs the main calculations and operations of the system and is responsible for general processing and executing commands. The CPU can be considered the brain of the computer, responsible for executing most commands and processing data. A GPU, translated as a graphics processor, is specifically optimized for computing graphics and image processing tasks. Originally developed to accelerate the creation of images in frame buffer memory for output to a display, GPUs are increasingly used for compute-intensive, non-graphical applications such as deep learning and cryptocurrency mining, as they can perform many calculations in parallel simultaneously. A FPGA (Field-Programmable Gate Array) is a programmable circuit whose configuration can be modified by the user after manufacturing. FPGAs are highly flexible and can be programmed for a variety of applications. They are formed of a matrix of programmable logic blocks connected by programmable interconnects. FPGAs are often used in situations where specific, custom hardware acceleration is needed or in development phases where the flexibility of hardware configuration is advantageous.

The invention also relates to a method for simulating a perception sensor on the basis of a simulation model, comprising the following method steps:

- generating, based on a virtual 3D environment, synthetic sensor data in such a way as the perception sensor would generate real sensor data in a real environment corresponding to the virtual 3D environment,
- transmitting the synthetic sensor data to a test specimen and reading in control commands from the test specimen via an interface, the interface including an electrical connection for simulating a power supply from the test specimen to the perception sensor,
- controlling a controllable resistor for controlling an electrical resistance of the electrical connection,
- calculating a power consumption of the simulated perception sensor from at least one variable value of the simulation model at runtime, and
- controlling the controllable resistor in such a way that a power consumption of the electrical connection corresponds to the calculated power consumption of the simulated perception sensor at any point in time during runtime of the simulation model.

Therefore, the invention also encompasses a method for simulating a perception sensor based on the described simulation model, including the generation of synthetic sensor data, transmission and reception of data and commands through the interface, and dynamic control of the electrical characteristics of the connection to simulate power consumption patterns accurately.

In summary, this invention presents a highly versatile and accurate simulator for perception sensors, capable of replicating a wide range of real-world conditions and scenarios in a virtual environment. Its innovative approach to simulating power consumption and electrical behavior, along with its adaptability to various sensor types and operating conditions, makes it a valuable tool in the development, testing, and validation of perception sensors.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
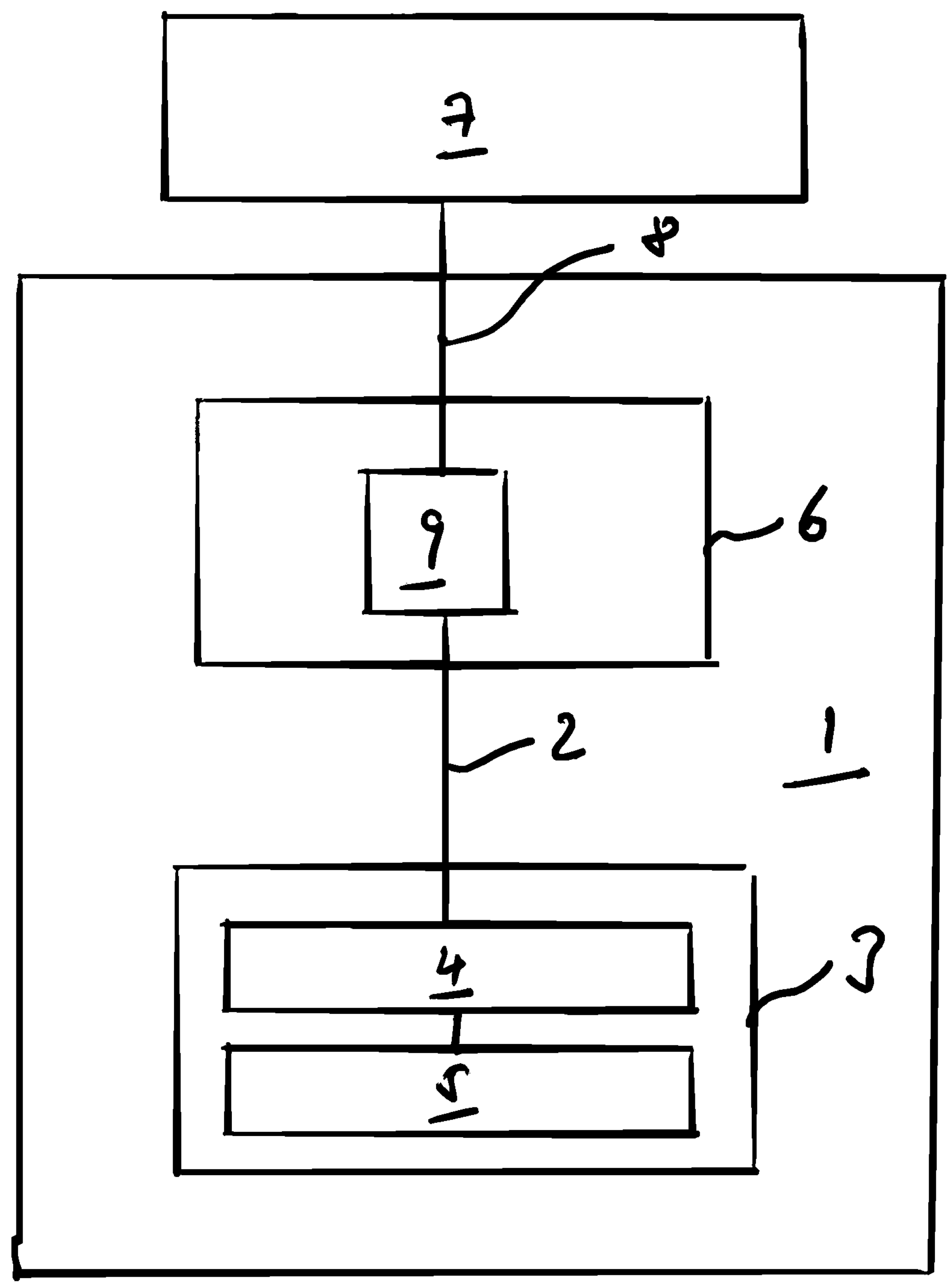
FIG. 1 schematically depicts a simulator arrangement according to an example of the invention, FIG. 2 schematically depicts a simulator arrangement according to an example of the invention, FIG. 3 schematically depicts a method which may be performed with the simulator according to FIG. 1, and FIG. 4 schematically depicts a method which may be performed with the simulator according to FIG. 2.

FIG. 1 schematically depicts an arrangement with a simulator 1 according to an example of the invention which is coupled to a test specimen 7. The simulator is a simulator for a perception sensor which may be an imaging sensor like a camera, a radar, a LIDAR, or a sonar. As can be understood from FIG. 1, the simulator 1 comprises a computing core 3 for an execution of a simulation model 4 of the perception sensor, wherein, based on a virtual 3D environment 5, the simulation model 4 generates synthetic sensor data in such a way as the perception sensor would generate real sensor data in a real environment corresponding to the virtual 3D environment 5. This synthetic sensor data is output from the computing core 3 via a data connection 2. According to an example of the invention, the computing core 3 is a CPU but, in the alternative, may also be a GPU or an FPGA.

The simulator 1 further comprises an interface 6 for transmitting the synthetic sensor data to the test specimen 7 which preferably is an ECU for automotive application. The interface 6 may also be used for reading in control commands from the test specimen 7. The interface 6 includes an electrical connection 8 for simulating a power supply from the test specimen 7 to the simulated perception sensor. This interface 6 comprises a controllable resistor 9 for controlling an electrical resistance of the electrical connection 8.

The electrical resistance of the electrical connection 8 is controlled by the controllable resistor 9 as follows: The simulation model 4 calculates a power consumption of the simulated perception sensor from variable values of the simulation model 4 at runtime and controls the controllable resistor 9 in such a way that a power consumption of the electrical connection 8 corresponds to the calculated power consumption of the simulated perception sensor at any point in time during runtime of the simulation model 4. A variable value of the simulation model 4 is a temperature of the simulated perception sensor. In this respect, the simulation model 4 takes into account a temperature dependence of an electrical behavior of at least one component of the simulated perception sensor.

The simulator 1 may further use other variable values for controlling the controllable resistor 9 wherein these other variable values are specific operating variables for the perception sensor. These values may comprise at least one from the following list: frames per second, exposures per image, and/or linear or exponential HDR output mode.

Figure 3:
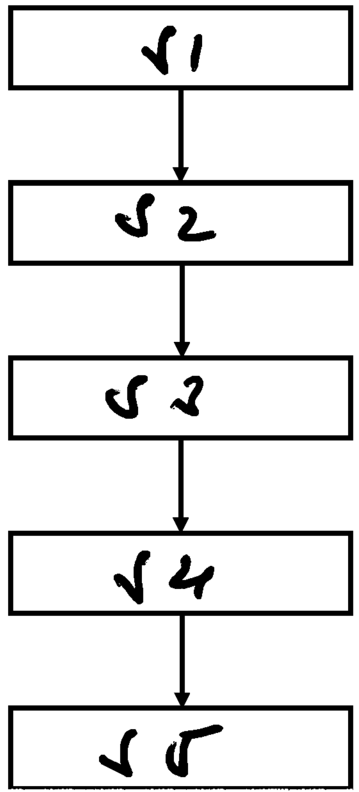

The following method for simulating a perception sensor on the basis of a simulation model 4 which is schematically depicted in FIG. 3 with its method steps S1 to S5 may be used for the above-described simulator arrangement:

Step S1) Generation of synthetic sensor data: This step involves creating synthetic sensor data that mimics the data a real perception sensor would generate in a corresponding real environment. The synthetic data is generated based on a detailed virtual 3D environment 5, which is a digital representation of a physical space. The simulation model 4 considers various environmental parameters and sensor characteristics to ensure that the synthetic data closely resembles what would be produced by an actual sensor in similar conditions.

Step S2) Transmission of data and reception of control commands: The synthetic sensor data generated in step S1 is transmitted to a test specimen 7, which represents a device or system intended to use the perception sensor. The test specimen 7 processes this data and issues control commands based on its analysis. These control commands are then read back into the simulation system via an interface 6. This interface 6 includes an electrical connection 8 designed to simulate the power supply mechanism from the test specimen 7 to the perception sensor.

Step S3) Control of electrical resistance: The controllable resistor 9 is employed to adjust the electrical resistance within the electrical connection 8. This step is crucial for simulating how the perception sensor's power consumption and electrical characteristics might change in response to different operational conditions and control commands received from the test specimen 7.

Step S4) Calculation of power consumption: The simulation model 4 actively calculates the power consumption of the simulated perception sensor. This calculation is based on variable values of the simulation model 4, which may include sensor operational parameters, environmental conditions, and the received control commands. The calculation is performed in real-time, ensuring dynamic adaptation of the simulation to changing conditions.

Step S5) Dynamic control of power consumption: In this step, the controllable resistor 9 is adjusted to ensure that the power consumption within the electrical connection 8 aligns with the calculated power consumption of the simulated perception sensor. This dynamic control is maintained throughout the runtime of the simulation model 4, allowing for a realistic simulation of the sensor's power requirements under varying operational scenarios.

Figure 2:
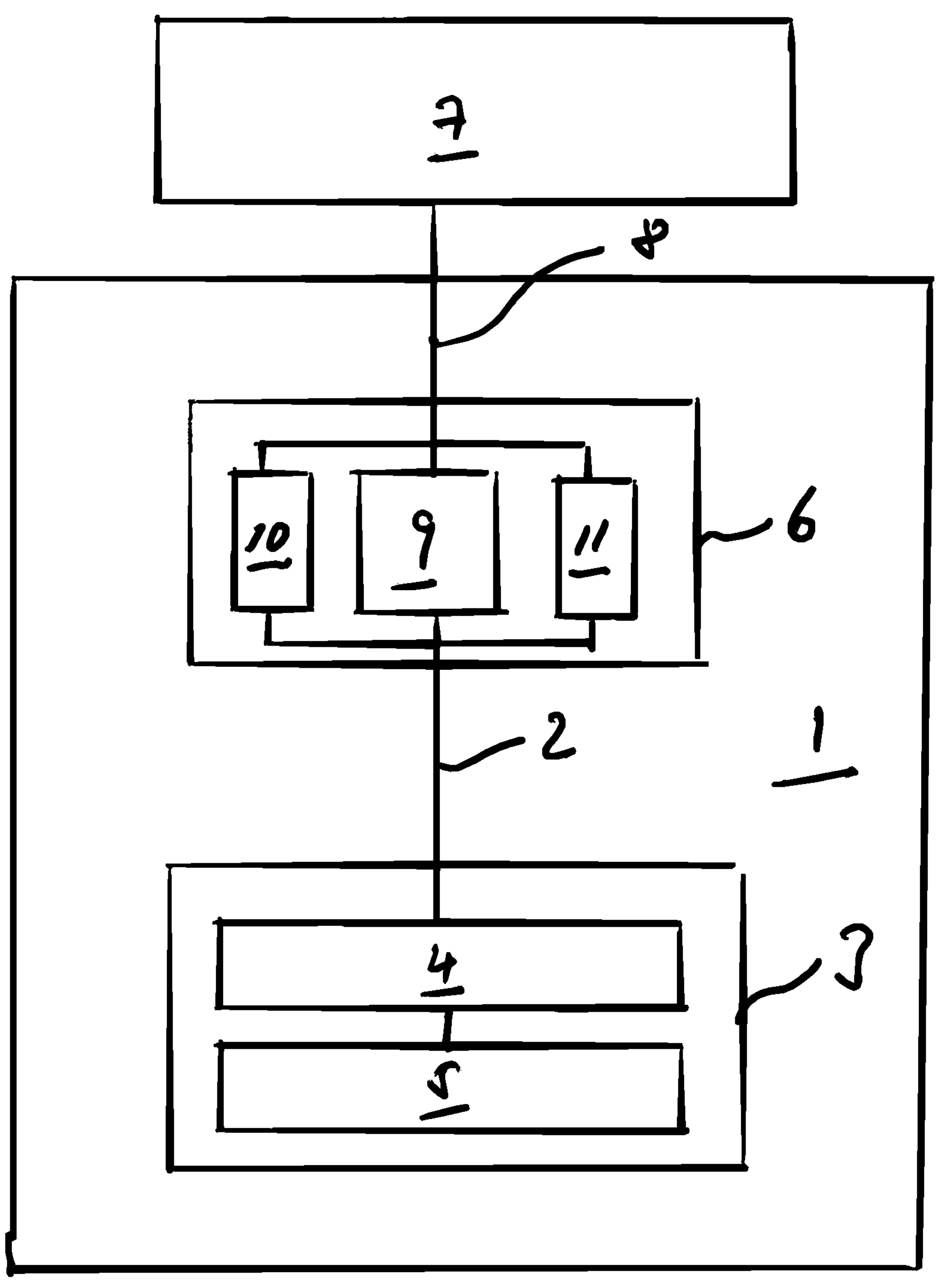

As depicted in FIG. 2, the electrical connection 8 also comprises a controllable capacitance 10 which can be controlled from at least one variable value of the simulation model 4 at runtime in accordance with the control of the controllable resistor 9, and further, the electrical connection 8 comprises a controllable inductance 11 which can be controlled from at least one variable value of the simulation model 4 at runtime in accordance with the control of the controllable resistor 9.

Figure 4:
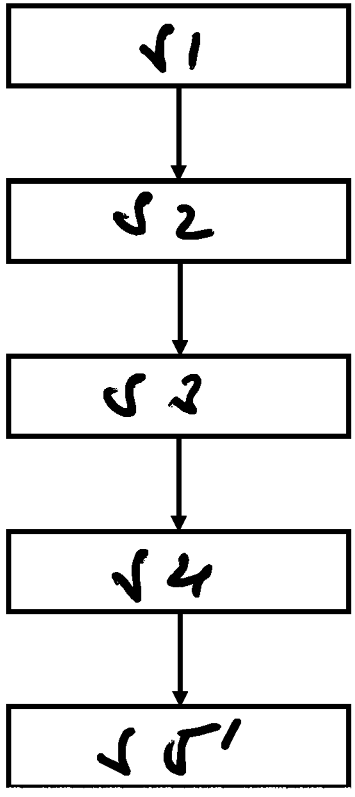

Am method used for the simulator arrangement of FIG. 2 would be identical to the method for the simulator arrangement of FIG. 1 described further above with respect to method steps S1 to S4. Instead of step S5, step S5' would be used in which, in addition to controlling the controllable resistor 9 in such a way that a power consumption of the electrical connection 8 corresponds to the calculated power consumption of the simulated perception sensor at any point in time during runtime of the simulation model 4 the controllable capacitance 10 is controlled from at least one variable value of the simulation model 4 at runtime in accordance with the control of the controllable resistor 9, and also the controllable inductance 11 is controlled from at least one variable value of the simulation model 4 at runtime in accordance with the control of the controllable resistor 9. This method is schematically depicted in FIG. 4 with its method steps S1 to S5'.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A simulator for a perception sensor, the simulator comprising:

a computing core for an execution of a simulation model of the perception sensor, the simulation model generating sensor data in such a way as the perception sensor would generate real sensor data in a real environment corresponding to the virtual 3D environment; and an interface to transmit the sensor data to a test specimen and to read in control commands from the test specimen, the interface comprising an electrical connection for simulating a power supply from the test specimen to the perception sensor, and the interface comprising a controllable resistor for controlling an electrical resistance of the electrical connection, the simulation model calculates a power consumption of the simulated perception sensor from at least one variable value of the simulation model at runtime and controls the controllable resistor such that a power consumption of the electrical connection corresponds to the calculated power consumption of the simulated perception sensor at any point in time during runtime of the simulation model.

2. The simulator according to claim 1, wherein the at least one variable value of the simulation model is a temperature of the perception sensor.

3. The simulator according to claim 2, wherein the simulation model takes into account a temperature dependence of an electrical behavior of at least one component of the perception sensor.

4. The simulator according to claim 1, wherein the at least one variable value is a specific operating variable for the perception sensor.

5. The simulator according to claim 4, wherein the specific operating variable is selected from: frames per second, exposures per image, and/or a linear or an exponential HDR output mode.

6. The simulator according to claim 1, wherein the electrical connection comprises a controllable capacitance which can be controlled from at least one variable value of the simulation model at runtime in accordance with the control of the controllable resistor.

7. The simulator according to claim 1, wherein the electrical connection comprises a controllable inductance which can be controlled from at least one variable value of the simulation model at runtime in accordance with the control of the controllable resistor.

8. The simulator according to claim 1, wherein the perception sensor is an imaging sensor.

9. The simulator according to claim 8, wherein the imaging sensor is a camera, a radar, a LIDAR or a sonar.

10. The simulator according to claim 1, wherein the computing core is a CPU, GPU or a FPGA.

11. The simulator according to claim 1, wherein the simulation model generates synthetic sensor data based on a virtual 3D environment.

12. The simulator according to claim 1, wherein the simulation model controls the controllable resistor such that the power consumption of the electrical connection corresponds to the calculated power consumption of the simulated perception sensor consistently through an entirety of the runtime of the simulation model.

13. The simulator according to claim 1, wherein the electrical connection comprises a controllable capacitance and a controllable inductance, which both can be controlled from at least one variable value of the simulation model at runtime in accordance with the control of the controllable resistor.

14. The simulator according to claim 1, wherein the test specimen is an ECU for an automotive application.

15. A method for simulating a perception sensor based on a simulation model, the method comprising:

generating sensor data in such a way as the perception sensor would generate real sensor data in a real environment corresponding to the virtual 3D environment, transmitting the sensor data to a test specimen and reading in control commands from the test specimen via an interface, the interface including an electrical connection for simulating a power supply from the test specimen to the perception sensor;

controlling a controllable resistor for controlling an electrical resistance of the electrical connection;

calculating a power consumption of the simulated perception sensor from variable values of the simulation model at runtime; and controlling the controllable resistor such that a power consumption of the electrical connection corresponds to the calculated power consumption of the simulated perception sensor at any point in time during runtime of the simulation model.

16. The method according to claim 15, wherein the at least one variable value of the simulation model is a temperature of the perception sensor and the simulation model takes into account a temperature dependence of an electrical behavior of at least one component of the perception sensor.

17. The method according to claim 15, wherein of the electrical connection comprises a controllable capacitance which are controlled from at least one variable value of the simulation model at runtime in accordance with the control of the controllable resistor.

18. The method according to claim 15, wherein the simulator comprises a controllable inductance which are controlled from at least one variable value of the simulation model at runtime in accordance with the control of the controllable resistor.

19. The method according to claim 15, wherein the sensor data is synthetic sensor data generated based on a virtual 3D environment.

* * * * *